United States Patent [19]

Braun et al.

[11] Patent Number: 4,790,425
[45] Date of Patent: Dec. 13, 1988

[54] CHAIN SCRAPER CONVEYOR HAVING CENTRALLY GUIDED TENSION CHAIN AND CATCHES ATTACHED THERETO

[75] Inventors: Gert Braun; Ernst Braun, both of Essen-Heisingen, Fed. Rep. of Germany

[73] Assignee: Halbach & Braun Industrieanlagen, Fed. Rep. of Germany

[21] Appl. No.: 938,649

[22] Filed: Dec. 5, 1986

[30] Foreign Application Priority Data

Dec. 7, 1985 [DE] Fed. Rep. of Germany ....... 3543349

[51] Int. Cl.⁴ .............................................. B65G 19/24
[52] U.S. Cl. .................................................. 198/731
[58] Field of Search .......................... 198/731, 725–731

[56] References Cited

U.S. PATENT DOCUMENTS

| | | | |
|---|---|---|---|
| 3,955,666 | 5/1976 | Braun et al. | 198/731 X |
| 4,265,359 | 5/1981 | Temme | 198/731 |
| 4,320,620 | 3/1982 | Rieger et al. | 198/734 X |
| 4,429,783 | 2/1984 | Clement | 198/731 |
| 4,600,097 | 7/1986 | Temme et al. | 198/731 |

FOREIGN PATENT DOCUMENTS

| | | | |
|---|---|---|---|
| 1199690 | 4/1960 | Fed. Rep. of Germany | 198/731 |
| 2102207 | 8/1972 | Fed. Rep. of Germany | 198/731 |
| 2427687 | 12/1975 | Fed. Rep. of Germany | 198/731 |

*Primary Examiner*—Robert J. Spar
*Assistant Examiner*—Lyle Kimms
*Attorney, Agent, or Firm*—McGlew and Tuttle

[57] ABSTRACT

A chain scraper conveyor with conveying chute includes a central guided tension chain and catches attached thereto, which are guided in the chute walls. The catches have undersides with a chain link holder assembly for an O-shaped chain link arranged parallel to the chute floor, and the chain link holder assembly includes a stirrup holder and a chain stirrup which is placed on the chain stirrup holder with the positioned chain link, and the stirrup is also positioned in the chain stirrup holder with the chain stirrup clamping the chain link into the chain stirrup holder in the area of its center. A set-screw is provided on each of the stirrup ends, which are set with play into a corresponding bore in the catch and secured by a nut on the other side of the catch. The chain stirrup is stretched into the stirrup holder with a curved elastic deformation, whose curve lies in the plane of the catch, and mounted on the chain link.

3 Claims, 4 Drawing Sheets

CHAIN SCRAPER CONVEYOR HAVING CENTRALLY GUIDED TENSION CHAIN AND CATCHES ATTACHED THERETO

FIELD AND BACKGROUND OF THE INVENTION

This invention relates in general to chain scraper conveyors and in particular to a new and useful chain scraper conveyor construction having a catch or scraper assembly with a chain stirrup holder which is prestressed into a curved elastic deformation.

The invention relate particularly to a chain scraper conveyor, in conformity with the type, with conveying chute, central guided tension chain and catches attached thereto, which are guided in the chute side pieces. The catches have an underside with a chain link holder for an O-shaped chain link arranged parallel to the chute floor. The catches also have a chain stirrup holder, where a chain stirrup is placed on the chain link holder with the positioned chain link as well as in the chain stirrup holder, and the chain stirrup clamps the chain link, fixing into the chain link in the area of its center. The chain stirrup is provided with a set-screw on its stirrup ends which is set with play into a corresponding bore in the catch and is screwed in on the other side of the catch.

With the typical chain scraper conveyors known from the practice, the chain stirrup, in a static respect, is almost a rigid component, which undergoes, at most, a slight elastic deformation along the set-screws to the catch. The deformation does not cause any stretching of the chain stirrup, however, but only a clamping of the chain link. Considerable tolerances are adjusted between the chain stirrup and the chain stirrup holder, between the chain link and the chain link holder, and also especially along the chain stirrup, in order to ensure that the chain stirrup always fits in the chain stirrup holder. The fastening arrangement, as a whole, can also hold chain links, which for their part bring along considerable tolerances required by production or operation. The chain stirrup holds the chain link fast with clamping forces which work in the direction of the set-screws. In operational use, especially in the area of the so-called roller turns, stresses occur which cause considerable moments between the catches and the tension chain subjected to a propelling force. These stresses lead, along with screwing with a high screw-moment, to tolerance limited relative motions between the described parts and to the disorientation of the catch with respect to the chain. The holders and the chain link held fast under the chain stirrup incline to one side, and an uncontrolled play disrupting the operation may appear. As a consequence, the useful lifetime of the scraper conveyor is impaired by these effects.

SUMMARY OF THE INVENTION

The invention provides a typical chain scraper conveyor with which tolerance-limited relative motions and the resulting uncontrolled play between the parts no longer occur and a reliable bracing and fastening of the chain links in the catches results. As a consequence, the useful lifetime of the chain scraper conveyor will be increased.

In accordance with the invention the chain stirrup is stretched into the stirrup holder with a curved elastic deformation, whose curve lies in the plane of the catches, and is mounted on the chain link. The invention thus eliminates the disrupting relative motions. In the assembled position the chain stirrup is held fast tolerance-free in the chain stirrup holder, specifically, by means of the described curved elastic deformation, which causes a corresponding bracing and thus also a reliable fastening of the chain link. The described elastic bracing may be embodied in different ways. A preferred form of embodiment of the invention, which is distinguished by simplicity in reference to production technology as well as assembly technology and which has proven itself functional, is characterized in that the chain stirrup holder has bracing surfaces with partially conical locating surfaces in the area of the stirrup ends and in the area of the stirrup center as well as being retractable in the conical fit by means of the set-screws and thus can be stretched as well as mounted on the chain link. The expression partially conical locating surfaces includes also inclined surfaces which work together like a wedge mechanism.

Accordingly it is an object of the invention to provide in a chain scraper conveyor a catch construction which includes a chain stirrup having a curved elastic deformation retained in a chain stirrup holder.

A further object of the invention is to provide a chain scraper conveyor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
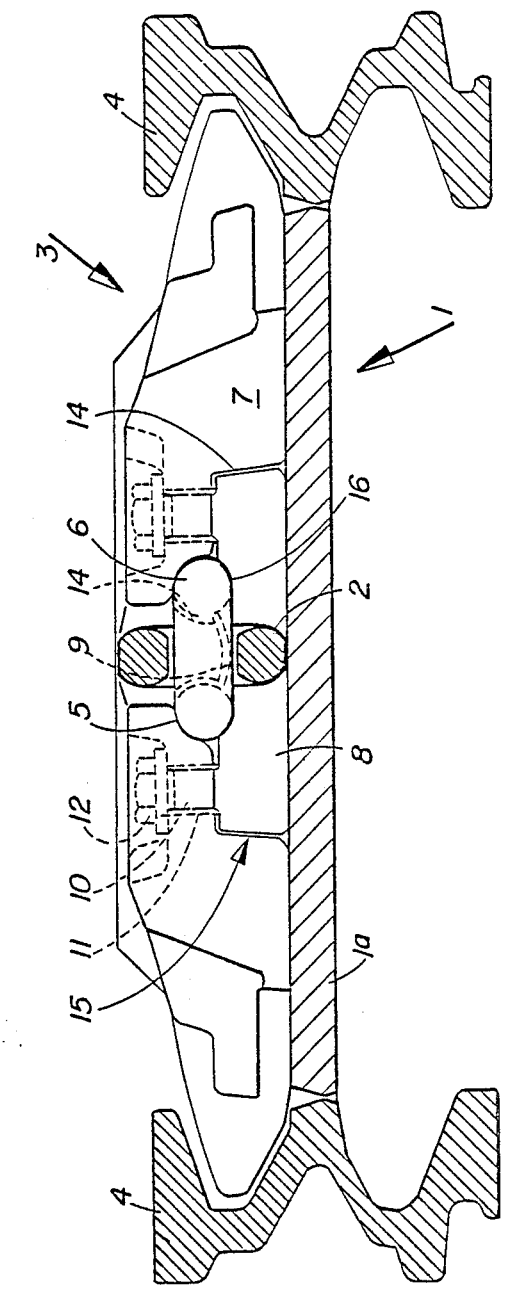
FIG. 1 is a section through a scraper conveyor according to the invention transverse to the conveying direction.

Referring to the drawings in particular the invention embodied therein comprises a chain scraper conveyor which includes a conveying chute 1 having a bottom 1a and side guide walls 4,4 and with a centrally guided tension chain 6 which is positioned between the side walls 4,4 and has interengaged O-shaped chain links. In accordance with the invention, a catch for a scraper generally designated 3 is connected to the chain 6 and has an underside movable over the bottom 1a and with a chain link holder assembly 20 for the chain 6 extending substantially parallel to the bottom 1a. A chain scraper and stirrup holder 7 has a substantially vertical receiving bore 11 on respective sides of the chain 6 so that clamping bolt elements 10,10 formed on respective ends of the chain stirrup 8 extend into respective bores 11,11 of the chain stirrups holder 7, and are secured therein by threaded securing nuts 12 secured on the bolts or set-screws 10. In accordance with a feature of the invention, the chain stirrup 8 is placed on the chain scraper and stirrup holder 7, so that it is in a curved elastic deformation form lying in the plane of the scraper or catch 3 of the holder 7.

In its fundamental construction, the chain scraper conveyor shown in the figures includes a conveying chute generally designated 1 with a central guided tension chain 6 with the catches 3 attached thereto, which are guided in the chute side walls 4. The chain scraper conveyor 1 has an upper track and a lower track.

The catches 3 have, on the underside, a chain link receiving recess 5 for an O-shaped chain link 6 arranged parallel to a chute floor 1a, as well as the chain stirrup holder 7. The chain stirrup 8 supports and clamps the chain link 6. The chain stirrup holder 7 fixed into the chain link 6 in the area of its center with a special projection 9 and the stirrup 8 is attached to the holder 7 with set-screw 10. Each set-screw 10 is set with play into a corresponding bore 11 in the adjoining catch 3 and screwed in on the other side of the catch 3 with the help of a nut 12.

Figure 2:
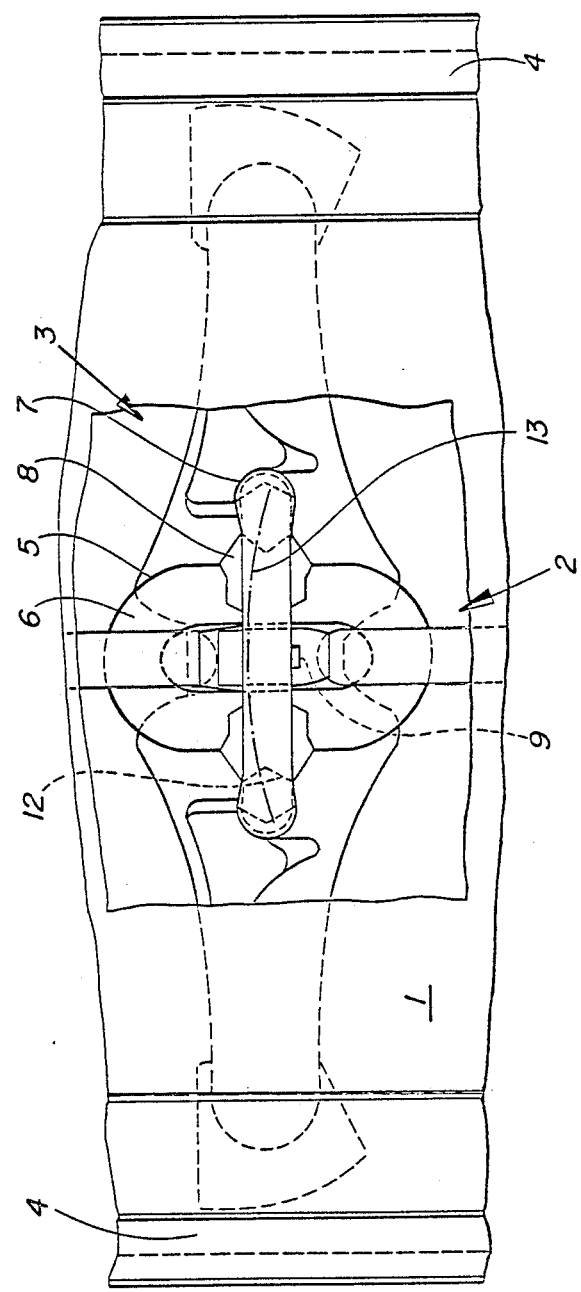
FIG. 2 is a broken-away bottom plan view of the scraper shown in FIG. 1.
Figure 3:
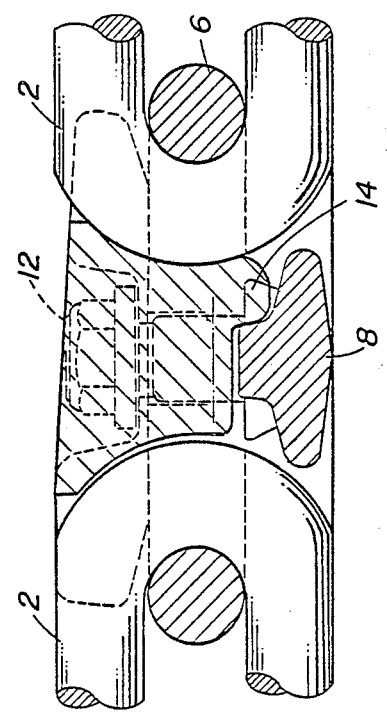
FIG. 3 is a view similar to FIG. 1, taken through the chain stirrup.
Figure 4:
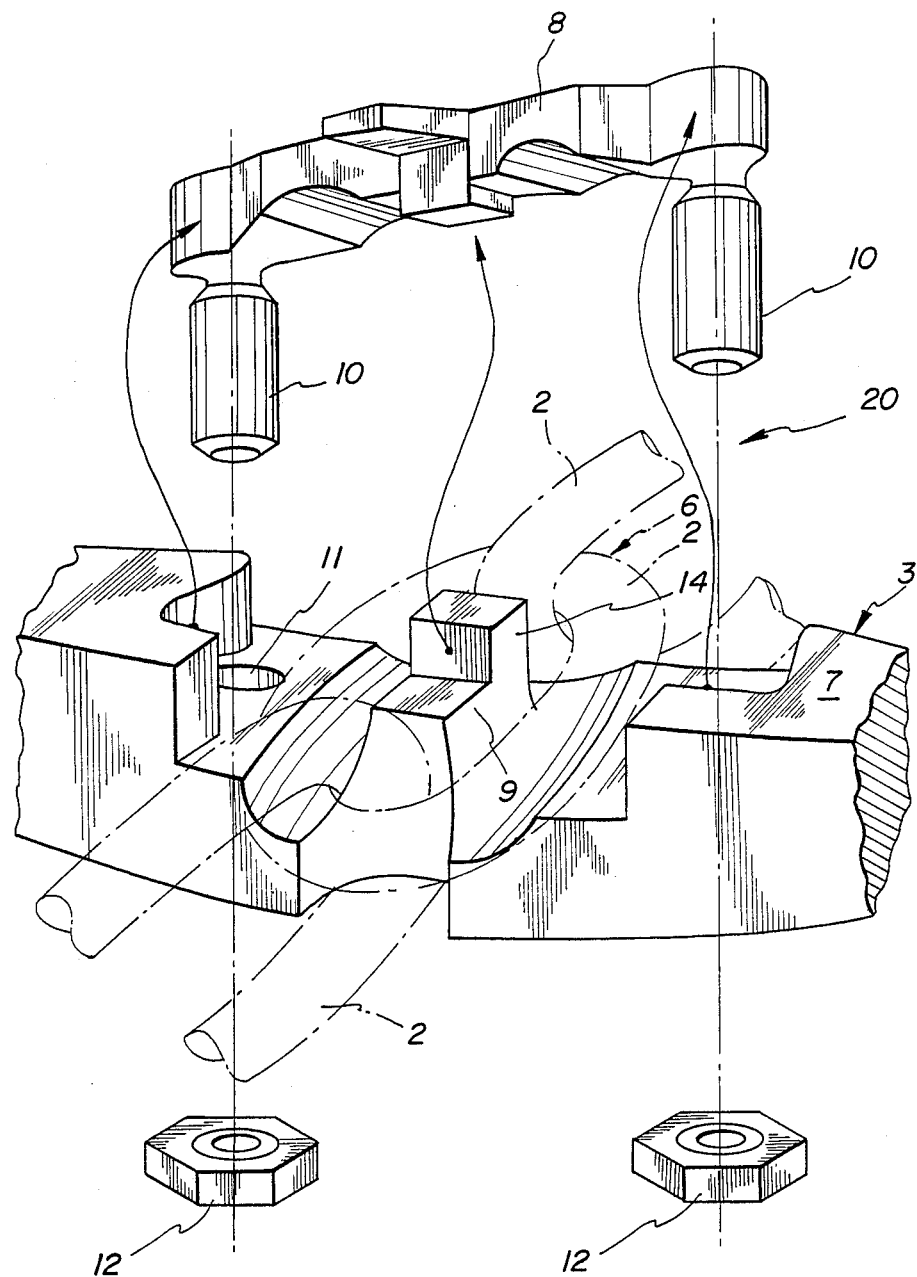
FIG. 4 is an exploded perspective view of the chain holder assembly.

The arrangement is set up so that the chain stirrup 8 is stretched into the chain stirrup holder 7 with a curved elastic deformation, whose curve lies in the plane of the catch 3, and it is mounted on the chain link. In FIG. 2 the corresponding curved line 13 has been drawn in as an exaggeratedly curved dot-dash line by thick strokes. It is to be understood from this that the chain stirrup 8 in the mounted position is elastically deformed similar to a beam on two supports with a central load. The arrangement is in particular set up so that the chain stirrup holder 7 has bracing surfaces 14 with partially conical locating surfaces in the region of the stirrup ends and in the region of the stirrup center. The taper is indicated by 15. It is accordingly accomplished that the chain stirrup is retractable in the conical fit by means of the set-screws 10. In that way it is fastened in curved line as described. However, it is also solidly braced on the chain link 6, in fact especially at 16, so that consequently a tolerance-free positioning results in the assembled position of the described components 4, 7, 8 and the chain link 6. Disrupting relative motions are no longer possible, and the useful lifetime is increased.

While specific embodiments of the invention have been shown and described in detail to illustrate the application of the principles of the invention, it will be understood that the invention may be embodied otherwise without departing from such principles.

What is claimed is:

1. A chain scraper conveyor comprising a conveyor trough having a bottom and side guide walls; a centrally guided tension chain between said guide walls; catches fastened to the chain that are guided by the side guide walls, the catches having an underside adjacent the trough bottom with a chain link holder assembly for attaching an O-shaped chain link located parallel to the bottom of the trough, said assembly including a chain stirrup holder, and an elongate chain stirrup having opposite ends which are receivable in the chain stirrup holder in cooperation therewith to releasably grip a central portion of the chain link securely to elastically deform the chain stirrup; said stirrup holder including a bore extending on each of the catches, clamping bolts provided on opposite ends of the chain stirrup which are set with play into the bores of said stirrup holder, and a clamping nut on the other side of the stirrup holder, characterised in that, the chain stirrup holder has bracing surfaces located adjacent the ends of the chain stirrup and the center of the chain stirrup, whereby the chain stirrup can be tightened progressively against the bracing surfaces by the clamping nuts to thereby tighten the chain link and to stretch the chain stirrup holder with an elastic arcuate deformation in the plane of the catch.

2. A chain scraper according to claim 1, wherein the bracing surfaces of the center of the holder are located on each side of the chain link.

3. A chain scraper according to claim 2 wherein the bracing surfaces on each side of the chain link are of partly conical profile.

* * * * *